United States Patent [19]

Kurtz

[11] 4,360,494

[45] Nov. 23, 1982

[54] PROCESS FOR REDUCING MELT FRACTURE DURING EXTRUSION OF A MOLTEN NARROW MOLECULAR WEIGHT DISTRIBUTION, LINEAR, ETHYLENE COPOLYMER

[75] Inventor: Stuart J. Kurtz, Martinsville, N.J.

[73] Assignee: Union Carbide Corporation, Danbury, Conn.

[21] Appl. No.: 249,914

[22] Filed: Apr. 1, 1981

[51] Int. Cl.³ .............................................. B29D 23/04
[52] U.S. Cl. ................................ 264/564; 264/176 R; 264/209.1; 264/209.8; 264/216; 425/326.1; 425/380; 425/461; 425/467; 526/124; 526/125
[58] Field of Search ............ 264/564, 209.1, 565–566, 264/177 R, 569, 209.8, 216, 176 R; 425/380, 461, 326.1, 467, 466, 376 A, 376 R; 526/124, 125, 126

[56] References Cited

U.S. PATENT DOCUMENTS

| 2,813,301 | 11/1957 | Underwood | 18/12 |
|---|---|---|---|
| 3,038,209 | 6/1962 | Hunter, Jr. et al. | 425/461 |
| 3,125,620 | 3/1964 | Skinner | 264/176 |
| 3,133,313 | 5/1964 | Corbett | 18/12 |
| 3,618,167 | 11/1971 | Brassard et al. | 18/855 |
| 3,859,017 | 1/1975 | Meudec | 425/380 |
| 3,876,740 | 4/1975 | Egli et al. | 425/380 |
| 3,879,158 | 4/1975 | Schele | 425/380 |
| 3,920,782 | 11/1975 | Cogswell | 264/209.7 |
| 3,947,214 | 3/1976 | Cunningham | 425/467 |
| 4,021,170 | 5/1977 | Anderson et al. | 264/209.1 |
| 4,112,166 | 9/1978 | Chyu | 264/177 R |
| 4,187,269 | 2/1980 | Hutchinson et al. | 264/209.1 |
| 4,243,619 | 1/1981 | Fraser et al. | 264/564 |
| 4,267,146 | 5/1981 | Kurtz et al. | 264/564 |
| 4,282,177 | 8/1981 | Kurtz et al. | 425/326.1 |

Primary Examiner—Jeffery R. Thurlow
Attorney, Agent, or Firm—Clement J. Vicari

[57] ABSTRACT

A process for reducing melt fracture formed during extrusion of a molten narrow molecular weight distribution, linear, ethylene polymer, which comprises extruding said polymer through a die having a discharge outlet defining an exit die gap formed by opposing die lip surfaces and wherein one surface of the die lip and/or die land in contact with the molten polymer extends beyond the opposing surface of the die lip and/or die land in the direction of the axis of flow of the molten polymer through the die exit and wherein said extended die lip has a groove extending around said extended die lip, said groove being disposed opposite the leading edge of the opposing die lip surface whereby melt fracture is reduced on both surfaces of the polymer leaving said die exit.

13 Claims, 3 Drawing Figures

PROCESS FOR REDUCING MELT FRACTURE DURING EXTRUSION OF A MOLTEN NARROW MOLECULAR WEIGHT DISTRIBUTION, LINEAR, ETHYLENE COPOLYMER

FIELD OF THE INVENTION

This invention relates to a method for reducing melt fracture, particularly sharkskin melt fracture, during extrusion of a molten narrow molecular weight distributuion, linear, ethylene copolymer, under conditions of flow rate and melt temperature which would otherwise produce such melt fracture.

BACKGROUND OF THE INVENTION

Conventional low density polyethylene has been historically polymerized in heavy walled autoclaves or tubular reactors at pressures as high as 50,000 psi and temperatures up to 300° C. The molecular structure of high pressure, low density polyethylene (HP-LDPE) is highly complex. The permutations in the arrangement of their simple building blocks are essentially infinite. HP-LDPE's are characterized by an intricate long chain branched molecular architecture. These long chain branches have a dramatic effect on the melt rheology of these resins. HP-LDPE's also possess a spectrum of short chain branches, generally 1 to 6 carbon atoms in length. These short chain branches disrupt crystal formation and depress resin density.

More recently, low pressure technology has been provided whereby low density polyethylene can now be produced at low pressures and temperatures by copolymerizing ethylene with various alphaolefins. These low pressure LDPE (LP-LDPE) resins generally possess little, if any, long chain branching. They are short chain branched with branch length and frequency controlled by the type and amount of comonomer used during polymerization.

U.S. Patent application Ser. No. 892,325 filed Mar. 3, 1978, now U.S. Pat. No. 4,163,756, and refiled as Ser. No. 014,414 on Feb. 27, 1979, now U.S. Pat. No. 4,302,566, in the names of F. J. Karol et al and entitled Preparation of Ethylene Copolymers In Fluid Bed Reactor, discloses that ethylene copolymers, having a density of 0.91 to 0.96, a melt flow ratio of $\geq 22$ to $\leq 32$ and a relatively low residual catalyst content can be produced in granular form, at relatively high productivities if the monomer(s) are copolymerized in a gas phase process with a specific high activity Mg-Ti containing complex catalyst which is blended with an inert carrier material.

U.S. patent application Ser. No. 892,322 filed Mar. 31, 1978, now abandoned, and refiled as Ser. No. 012,720 on Feb. 16, 1979, now U.S. Pat. No. 4,302,565, in the names of G. L. Goeke et al and entitled Impregnated Polymerization Catalyst, Process For Preparing, and Use For Ethylene Copolymerization discloses that ethylene copolymers, having a density of 0.91 to 0.96, a melt flow ratio of $\geq 22$ to $\leq 32$ and a relatively low residual catalyst content can be produced in granular form, at relatively high productivities, if the monomer(s) are copolymerized in a gas phase process with a specific high-activity Mg-Ti-containing complex catalyst which is impregnated in a porous inert carrier material.

U.S. patent application Ser. No. 892,037 filed Mar. 31, 1978, now abandoned, and refiled as Ser. No. 014,412 on Feb. 27, 1979, in the names of B. E. Wagner et al and entitled Polymerization Catalyst, Process For Preparing And Use For Ethylene Homopolymerization, discloses that ethylene homopolymers having a density of about $\geq 0.958$ to $\leq 0.972$ and a melt flow ratio of about $\geq 22$ to about $\leq 32$ which have a relatively low residual catalyst residue can be produced at relatively high productivities for commercial purposes by a low pressure gas phase process if the ethylene is homopolymerized in the presence of a high-activity Mg-Ti-containing complex catalyst which is blended with an inert carrier material. The granular polymers thus produced are useful for a variety of end-use applications.

The polymers as produced, for example, by the processes of said applications using the Mg-Ti containing complex catalyst possess a narrow molecular weight distribution, Mw/Mn, of about $\geq 2.7$ to $\leq 4.1$.

Over the years, film extrusion equipment has been optimized for the rheology of HP-LDPE. The different molecular architecture of LP-LDPE results in a film processing behavior which requires different extrusion parameters. Although LP-LDPE resins can be extruded on equipment designed for HP-LDPE resins, certain equipment modifications are often required in order to extrude the low pressure resins at optimum conditions and at rates comparable to the high pressure resins. This is particularly true during extrusion of LP-LDPE which is processed into film. The problem appears to be that during extrusion of these particular resins, two aspects of rheological behavior play a significant role, i.e. shear and extension. Within a film extruder and extrusion die, a polymeric melt undergoes severe shearing deformation. As the extrusion screw pumps the melt to, and through, the film die, the melt experiences a wide range of shear rates. Most film extrusion processes are thought to expose the melt to shear at rates in the 100–5000 sec$^{-1}$ range. Polymeric melts are known to exhibit what is commonly termed shear thinning behavior, i.e., non-Newtonian flow behavior. As shear rate is increased, viscosity (the ratio of shear stress, $\tau$, to shear rate, $\gamma$) decreases. The degree of viscosity decrease depends upon the molecular weight, its distribution, and molecular configuration, i.e., long chain branching of the polymeric material. Short chain branching has little effect on shear viscosity. In general, high pressure low density polyethylenes have a broad molecular weight distribution and show enhanced shear thinning behavior in the shear rate range common to film extrusion. The narrow molecular weight distribution resins used in the present invention exhibit reduced shear thinning behavior at extrusion shear rates. The consequences of these differences are that the narrow distribution resins used in the present invention require higher power and develop higher pressures during extrusion than the high pressure low density polyethylene resins of broad molecular weight distribution and of equivalent average molecular weight.

The rheology of polymeric materials is customarily studied in shear deformation. In simple shear the velocity gradient of the deforming resin is perpendicular to the flow direction. The mode of deformation is experimentally convenient but does not convey the essential information for understanding material response in film fabrication processes. As one can define a shear viscosity in terms of shear stress and shear rate, i.e.:

$$\eta \text{shear} = \tau_{12}/\dot{\gamma}$$

where $\eta_{shear}$ = shear viscosity (poise)
$\tau_{12}$ = shear stress (dynes/cm$^2$)
$\dot{\gamma}$ = shear rate (sec$^{-1}$)

an extensional viscosity can be defined in terms of normal stress and strain rate, i.e.,:

$$\eta_{ext} = \pi/\dot{\epsilon}$$

$\Theta_{ext}$ = extensional viscosity (poise)
$\pi$ = normal stress (dynes/cm$^2$)
$\dot{\epsilon}$ = strain rate (sec$^{-1}$)

Due to the high shear stress developed during extrusion of a high molecular weight ethylene polymer having a narrow molecular weight distribution, melt fracture, particularly sharkskin melt fracture, occurs. Sharkskin melt fracture has been described in the literature for a number of polymers. "Sharkskin" is a term used to describe a particular type of surface irregularity which occurs during extrusion of some thermoplastic materials under certain conditions. It is characterized by a series of ridges perpendicular to the flow direction and is described by J. A. Brydson, *Flow Properties of Polymer Melts*, Van Nostrand-Reinhold Company (1970), pages 78–81.

In the present process, the onset of sharkskin melt fracture is determined by visual observation of the surfaces of the film in its final form, i.e. after film winding. Specifically, this procedure for determining sharkskin melt fracture is as follows: The film is viewed and examined under a 20× magnification Nikon Profile Projector Model 6E using transmitted light. This observation shows a non-ridged surface (at no melt fracture) to a ridged surface under conditions of melt fracture. In another technique, the film can be held up to light and visually examined by the naked eye to determine the presence, severity or absence of melt fracture.

The narrow molecular weight distribution ethylene polymers as described herein exhibit the characteristics of sharkskin melt fracture upon extruding using the prior art extrusion processes. These characteristics include a pattern of wave distortion perpendicular to the flow direction; occurrence at low extrusion rates (less than expected for elastic turbulence); not effected by the use of commonly employed metal die materials; and less melt fracture with increasing temperature.

There are several known methods for eliminating sharkskin melt fracture in polymers. These methods include increasing the resin temperature. However, in film formation this method is not commercially useful since increasing resin temperature generally causes lower rates of film formation, due to bubble instability or heat transfer limitations. Another method for eliminating sharkskin is described in U.S. Pat. No. 3,920,782. In this method sharkskin formed during extrusion of polymeric materials is controlled or eliminated by cooling an outer layer of the material to close to the fusion temperature so that it emerges from the die with a reduced temperature while maintaining the bulk of the melt at the optimum working temperature. However, this method is difficult to employ and control.

The invention of U.S. Pat. No. 3,920,782 is apparently based on the inventor's conclusions that the onset of sharkskin melt fracture under his operating conditions with his resins is a function, basically, of exceeding a critical linear velocity with his resins through his dies at his operating temperatures. In the process of the present invention, however, the onset of sharkskin melt fracture in the present applicants' resins under their operating conditions is a function, primarily, of exceeding a critical shear stress, and, to a lesser extent, a function of exceeding a critical linear velocity.

More recent attempts have been made to reduce sharkskin melt fracture during extrusion of the particular ethylene polymers disclosed herein by geometric changes in the die. For example Application Ser. No. 099,061 filed on Dec. 12, 1979, now U.S. Pat. No. 4,282,177 and which is a continuation-in-part of Application Ser. No. 001,932 filed Jan. 8, 1979, now U.S. Pat. No. 4,267,146, discloses a method for reducing sharkskin melt fracture during extrusion of a molten narrow molecular weight distribution linear ethylene polymer by extruding the polymer through a die having a die gap greater than about 50 mils and wherein at least a portion of one surface of the die lip and/or die land in contact with the molten polymer is at an angle of divergence or convergence relative to the axis of flow of the molten polymer through the die. In addition, Application Ser. No. 012,793 filed on Feb. 16, 1979, now U.S. Pat. No. 4,271,092 discloses a process for forming blown tubular film essentially free of melt fracture by extruding the particular polymer through an extrusion die having a die gap of greater than about 50 mils and at a drawdown ratio of greater than about 2 to less than about 250.

Finally, according to application Ser. No. 192,701 filed on Oct. 1, 1980 now pending and which is assigned to a common assignee, sharkskin melt fracture is reduced by extruding polymer through a die having a discharge outlet defining an exit die gap formed by opposing die lip surfaces and wherein one surface of the die lip and/or die land in contact with the molten polymer extends beyond the opposing surface of the die lip and/or die land in the direction of the axis of flow of the molten polymer through the die exit whereby melt fracture is reduced on the surface of the polymer leaving the extended die lip surface.

In the process of the present invention melt fracture, particularly sharkskin melt fracture, can be virtually eliminated on both surfaces of an extruded film formed from the polymers contemplated herein, by geometric changes in the die, i.e., by extruding the narrow molecular weight distribution ethylene polymer, at normal film extrusion temperatures through a die having a discharge outlet defining an exit die gap and wherein one surface of the die lip and/or die land in contact with the molten polymer extends beyond the opposing surface of the die lip and/or die land in the direction of the axis of flow of the molten polymer through the die exit and wherein said extended die lip has a groove extending around said extended die lip, said groove being disposed opposite the surface of the opposing die lip and preferably opposite the leading edge of the opposing die lip surface, whereby melt fracture is reduced on both surfaces of the polymer leaving said die lip exit. The utility of the process of the present invention arises due to the fact that the stress field at the exit of the die determines the creation of sharkskin melt fracture. Thus, sharkskin melt fracture can be controlled or eliminated by the geometry at the exit of the die.

Films suitable for packaging applications must possess a balance of key properties for broad end-use utility and wide commercial acceptance. These properties include film optical quality, for example, haze, gloss, and see-through characteristics. Mechanical strength properties such as puncture resistance, tensile strength, impact strength, stiffness, and tear resistance are important. Vapor transmission and gas permeability characteristics are important considerations in perishable goods packaging. Performance in film converting and packaging equipment is influenced by film properties such as coefficient of friction, blocking, heat sealability and flex resistance. Low density polyethylene has a wide range of utility such as in food packaging and non-food packaging applications. Bags commonly produced from low density polyethylene include shipping sacks, textile bags, laundry and dry cleaning bags and trash bags. Low density polyethylene film can be used as drum liners for a number of liquid and solid chemicals and as protective wrap inside wooden crates. Low density polyethylene film can be used in a variety of agricultural and horticultural applications such as protecting plants and crops, as mulching, for storing of fruits and vegetables. Additionally, low density polyethylene film can be used in building applications such as a moisture or moisture vapor barrier. Further, low density polyethylene film can be coated and printed for use in newspapers, books, etc.

Possessing a unique combination of the aforedescribed properties, high pressure low density polyethylene is the most important of the thermoplastic packaging films. It accounts for about 50% of the total usage of such films in packaging. Films made from the polymers of the present invention, preferably the ethylene hydrocarbon copolymers, offer an improved combination of end-use properties and are especially suited for many of the applications already served by high pressure low density polyethylene.

An improvement in any one of the properties of a film such as elimination or reduction of sharkskin melt fracture or an improvement in the extrusion characteristics of the resin or an improvement in the film extrusion process itself is of the utmost importance regarding the acceptance of the film as a substitute for high pressure low density polyethylene in many end use applications.

In the case where a single layer film is extruded consisting entirely of LP-LDPE resin, the reduction in melt fracture would occur on both surfaces of the film in contact with the die lips.

DRAWINGS

SUMMARY OF THE INVENTION

It has now been found that melt fracture, particularly sharkskin melt fracture formed during extrusion of a molten narrow molecular weight distribution, linear, ethylene polymer, at normal film extrusion temperature can be substantially eliminated or significantly reduced by extruding said polymer through a die having a discharge outlet defining an exit die gap formed by opposing die lip surfaces and wherein one surface of the die lip and/or die land in contact with the molten polymer extends beyond the opposing surface of the die lip and/or die land in the direction of the axis of flow of the molten polymer through the die exit, said extended die lip having a groove extending around said extended die lip, said groove being disposed opposite the surface of the opposing die lips and preferably opposite the leading edge of the opposing die lip surfaces whereby melt fracture is reduced on the surface of the film leaving the extended die lip surface.

DESCRIPTION OF THE PREFERRED EMBODIMENT DIES

The molten ethylene polymer is extruded through a die, preferably an annular die, having an extended die lip and a groove in the extended portion. The die which may be used in the present invention may be a spiral annular die, slit die, etc.

Figure 1:
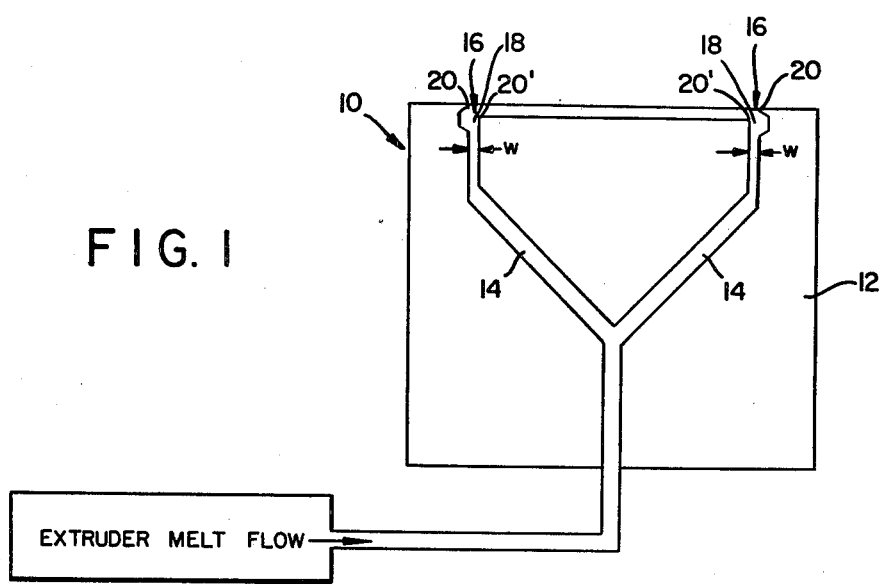
FIG. 1 is a cut-away of a spiral/spider annular die for producing mono-layer film.

FIG. 1 is a cross-sectional view of a spiral/spider annular die 10 through which the molten thermoplastic ethylene polymer is extruded to form a single layer film, tube or pipe. Die block 12 contains channels 14 for directing the polymer to the die exit. As the molten thermoplastic ethylene polymer is extruded, it spreads out as it passes into the die channels 14.

Figure 2:
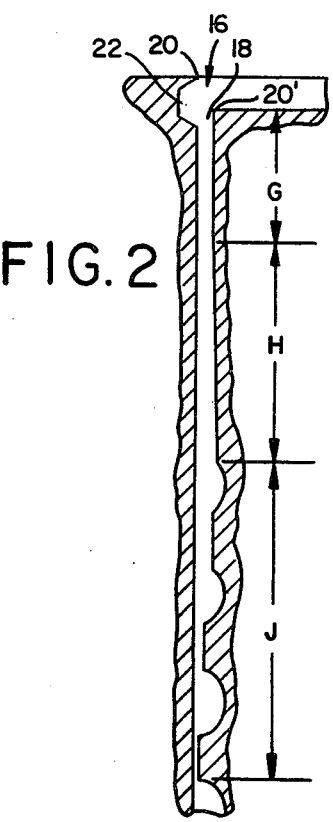
FIG. 2 shows a cross-section of the spiral die showing the offset configuration and the groove.

Referring to FIG. 2, which is a cross-section of a spiral die, there is indicated a spiral section J land entry section H and die land G. With reference to FIGS. 1 and 2, at the exit of the die, there is a die discharge outlet identified generally by reference numeral 16. The discharge outlet defines an exit die gap 18 which is formed by opposing surfaces of die lips 20 and 20'.

Figure 3:
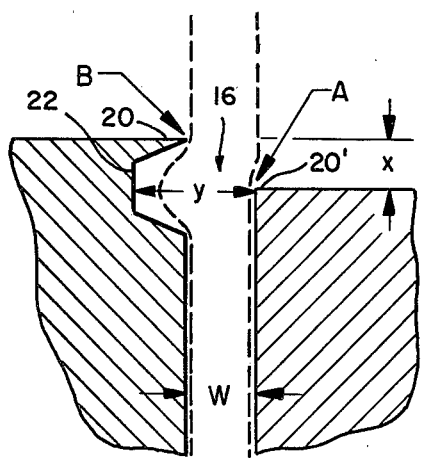
FIG. 3 is an enlarged view of the groove portion and die lips illustrated in FIG. 2, and further includes film represented by dotted lines passing through the die.

As seen from FIG. 3 the die lip 20 is offset from the outer edge of die lip 20' a distance X. Generally X can be a distance of about 0.010 inch to about 0.400 inch and preferably about 0.050 inch to about 0.250 inch. Thus the leading edge A of die lip 20' is offset from the leading edge B of the die lip 20. In the preferred embodiment, the leading edge defining the furthermost portion of groove 22 coincides with leading edge B. However, it will be understood that it need not coincide and that the leading edge defining the groove can be a slight distance away from leading edge B.

The distance W represents the effective die gap which can range from about 0.015 to 0.125 inch whereas the letter Y represents the distance between the leading edge A and the furthermost inward distance of the die groove in line with said leading edge. Generally this distance can be from about 0.030 inch to 0.250 inch preferably 0.050 inch to 0.125 inch. As best seen in FIGS. 2 and 3 the groove preferably has a generally trapezoidal configuration (without base). Although other type configurations have some success such as semi-circular, curved, etc., it has been found that the trapezoidal configuration provides the best results.

The length of the die groove can be from the leading edge B or slightly below the leading edge B to a point below the opposite leading edge 20'.

Although the extended die lip 20 is shown in connection with the outer surface, it will be understood that the extended die lip can be on the inner surface in which case the geometry of the die exit would be reversed.

As mentioned previously, the present method is suitable for the formation of monolayer film although multilayer films can also be effectively processed.

FILM EXTRUSION

I. Blown Film Extrusion

The films formed as disclosed herein may be extruded by tubular blown film extrusion process. In this process a narrow molecular weight distribution polymer is melt extruded through an extruder. This extruder may have an extrusion screw therein with a length to diameter ratio of between 15:1 to 21:1, as described in U.S. Patent Application Ser. No. 940,005, filed Sept. 6, 1978, and refiled as Ser. No. 064,399 on Aug. 8, 1979, in the names of John C. Miller, et al, and entitled "A Process For Extruding Ethylene Polymers". This application describes that this extrusion screw contains a feed, transition and metering section. Optionally, the extrusion screw can contain a mixing section such as that described in U.S. Pat. Nos. 3,486,192; 3,730,492 and 3,756,574, which are incorporated herein by reference. Preferably, the mixing section is placed at the screw tip.

The extruder which may be used herein may have a 18:1 to 32:1 length to internal diameter barrel ratio. The extrusion screw used in the present invention may have a length to diameter ratio of 15:1 to 32:1. When, for example, an extrusion screw of a length to diameter ratio of 18/1 is used in a 24/1 extruder, the remaining space in the extrusion barrel can be partially filled with various types of plugs, torpedoes, or static mixers to reduce residence time of the polymer melt.

The molten polymer is then extruded through a die, as will hereinafter be described.

The polymer is extruded at a temperature of about 325° to about 500° F. The polymer is extruded in an upward vertical direction in the form of a tube although it can be extruded downward or even sideways. After extrusion of the molten polymer through the annular die, the tubular film is expanded to the desired extent, cooled, or allowed to cool and flattened. The tubular film is flattened by passing the film through a collapsing frame and a set of nip rolls. These nip rolls are driven, thereby providing means for withdrawing the tubular film away from the annular die.

A positive pressure of gas, for example, air or nitrogen, is maintained inside the tubular bubble. As is known in the operation of conventional film processes, the pressure of the gas is controlled to give the desired degree of expansion to the tubular film. The degree of expansion, as measured by the ratio of the fully expanded tube circumference to the circumference of the die annulus, is in the range 1/1 to 6/1 and preferably, 1/1 to 4/1. The tubular extrudate is cooled by conventional techniques such as, by air cooling, water quench or mandrel.

The drawdown characteristics of the polymers disclosed herein are excellent. Drawdown, defined as the ratio of the die gap to the product of film gauge and blow up ratio, is kept greater than about 2 to less than about 250 and preferably greater than about 25 to less than about 150. Very thin gauge films can be produced at high drawdown from these polymers even when said polymer is highly contaminated with foreign particles and/or gel. Thin gauge films of about 9.5 to 3.0 mils can be processed to exhibit ultimate elongations MD greater than about 400% to about 700% and TD greater than about 500% to about 700%. Furthermore, these films are not perceived as "splitty". "Splittiness" is a qualitative term which describes the notched tear response of a film at high deformation rates. "Splittiness" reflects crack propagation rate. It is an end-use characteristic of certain types of film and is not well understood from a fundamentals perspective.

As the polymer exits the annular die, the extrudate cools and its temperature falls below its melting point and it solidifies. The optical properties of the extrudate change as crystallization occurs and a frost line is formed. The position of this frost line above the annular die is a measure of the cooling rate of the film. This cooling rate has a very marked effect on the optical properties of the film produced herein.

The ethylene polymer can also be extruded in the shape of a rod or other solid cross section using the same die geometry for only the external surface. Additionally, the ethylene polymer can also be extruded into pipe through annular dies.

II. Slot Cast Film Extrusion

The films formed as disclosed herein may also be extruded by slot cast film extrusion. This film extrusion method is well known in the art and comprises extruding a sheet of molten polymer through a slot die and then quenching the extrudate using, for example, a chilled casting roll or water bath. In the chill roll process, film may be extruded horizontally and laid on top of the chill roll or it may be extruded downward and drawn under the chill roll. Extrudate cooling rates in the slot cast process are very high. Chill roll or water bath quenching is so fast that as the extrudate cools below its melting point, crystallites nucleate very rapidly, supramolecular structures have little time to grow and spherulites are held to a very small size. The optical properties of slot cast film are vastly improved over those characterizing films using the slow cooling rate, tubular blown film extrusion process. Compound temperatures in the slot cast film extrusion process generally run much higher than those typifying the tubular blown film process. Melt strength is not a process limitation in this film extrusion method. Both shear viscosity and extensional viscosity are lowered. Film can generally be extruded at higher output rate than practiced in the blown film process. The higher temperatures reduce shear stresses in the die and raise the output threshold for melt fracture.

FILM

The film produced by the method of the present invention has a thickness of greater than about 0.10 mils to about 20 mils, preferably greater than about 0.10 to 10 mils, most preferably greater than about 0.10 to 4.0 mils. The 0.10 to 4.0 mil film is characterized by the following properties: a puncture resistance value of greater than about 7.0 in-lbs/mil; an ultimate elongation of greater than about 400%; a thermal shrinkage of less than 3% after heating to 105°–110° C. and cooling to room temperature; tensile impact strength of greater than about 500 to about 2000 ft-lbs/in$^3$ and tensile strength greater than about 2000 to about 7000 psi.

Various conventional additives such as slip agents, antiblocking agents, and antioxidants can be incorporated in the film in accordance with conventional practice.

THE ETHYLENE POLYMERS

The polymers which may be used in the process of the present invention are linear homopolymers of ethylene or linear copolymers of a major mol percent ($\geq 90\%$) of ethylene, and a minor mol percent ($\leq 10\%$) of one or more $C_3$ to $C_8$ alpha olefins. The $C_3$ to $C_8$ alpha olefins should not contain any branching on any of their carbon atoms which is closer than the fourth carbon atom. The preferred $C_3$ to $C_8$ alpha olefins are propylene, butene-1, pentene-1, hexene-1, 4-methylpentene-1 and octene-1.

The ethylene polymers have a melt flow ratio of about $\geq 22$ to $\leq 32$, and preferably of about $\geq 25$ to $\leq 30$. The melt flow ratio value is another means of indicating the molecular weight distribution of a polymer. The melt flow ratio (MFR) range of $\geq 22$ to $\leq 32$ thus corresponds to a Mw/Mn value range of about 2.7 to 4.1.

The homopolymers have a density of about $\geq 0.958$ to $\leq 0.972$ and preferably of about $\geq 0.961$ to $\leq 0.968$.

The copolymers have a density of about $\geq 0.91$ to $\leq 0.96$ and preferably $\geq 0.917$ to $\leq 0.955$, and most preferably, of about $\geq 0.917$ to $\leq 0.935$. The density of the copolymer, at a given melt index level for the copolymer, is primarily regulated by the amount of the $C_3$ to $C_8$ comonomer which is copolymerized with the ethylene. In the absence of the comonomer, the ethylene would homopolymerize with the catalyst of the present invention to provide homopolymers having a density of about $\geq 0.96$. Thus, the addition of progressively larger amounts of the comonomers to the copolymers results in a progressive lowering of the density of the copolymer. The amount of each of the various $C_3$ to $C_8$ comonomers needed to achieve the same result will vary from monomer to monomer, under the same reaction conditions.

Thus, to achieve the same results, in the copolymers, in terms of a given density, at a given melt index level, larger amounts of the different comonomers would be needed in the order of $C_3 > C_4 > C_5 > C_6 > C_7 > C_8$.

The melt index of a homopolymer or copolymer is a reflection of its molecular weight. Polymers having a relatively high molecular weight, have relatively high viscosities and low melt index. Ultrahigh molecular weight ethylene polymers have a high load (HLMI) melt index of about 0.0 and a very high molecular weight, ethylene polymers have a high load melt index (HLMI) of about 0.0 to about 1.0. The polymers of the present invention have a standard or normal load melt index of $\geq 0.0$ to about 50, and preferably of about 0.5 to 35, and a high load melt index (HLMI) of about 11 to about 950. The melt index of the polymers is a function of a combination of the polymerization temperature of the reaction, the density of the copolymer and the hydrogen/monomer ratio in the reaction system. Thus, the melt index is raised by increasing the polymerization temperature and/or by decreasing the density of the polymer and/or by increasing the hydrogen/monomer ratio.

The ethylene polymers of the present invention have an unsaturated group content of $\leq 1$, and usually $\geq 0.1$ to $\leq 0.3$, C—C/1000 carbon atoms, and a cyclohexane extractables content of less than about 3, and preferably less than about 2, weight percent.

Having set forth the general nature of the invention, the following examples illustrate some specific embodiments of the invention. It is to be understood, however, that this invention is not limited to the examples, since the invention may be practiced by the use of various modifications.

EXAMPLE I

This Example demonstrates the conventional procedures for extruding ethylene polymers into tubes.

An ethylene-butene copolymer which was prepared in accordance with the procedure of U.S. Patent application Ser. No. 852,325 filed Mar. 31, 1978, now U.S. Pat. No. 4,159,500 in the names of F. J. Karol, et al, and which is available from Union Carbide Corporation under the Trademark designation Bakelite GRSN 7040 was formed into a tube using a 2½ inch diameter extruder having a standard polyethylene screw with a Maddock mixing section. The copolymer had a density of 0.9197 gm/cc, and a melt index of 2.17 decigrams/min. The copolymer was formed into a tube which had a film thickness of 0.0015 inches by passing the resin through a conventional 2½" diameter screw extruder and into a conventional die having a die land length of 1⅜", a 3.00 inch die diameter and a die gap of 0.040". The sides of the die land were parallel with the flow axis of the polymer melt. There was no offset configuration, nor any grooves in the opposing die lip surface. The resin was extruded through the die at various rates utilizing extruder screw speeds in the range of 10 to 42 R.P.M. There was severe sharkskin melt fracture observed at all screw speeds, with the severity increasing with increasing screw speeds. The melt fracture was determined visually by holding the film against the light.

EXAMPLE II

This Example demonstrates the use of an offset die without a groove. The resin used in Example I was passed through the same extrusion system of Example I. The die utilized was similar to Example I except that one of the die lips was offset by 0.050". The resin was extruded through the die at various rates up to 46 R.P.M. extruder screw speeds. Severe melt fracture was observed by visual observation, although no effort was made to distinguish melt fracture levels on either side of the film.

EXAMPLE III

This Example demonstrates the substantially reduced melt fracture observed by utilizing the die having the offset and groove of the present invention.

The resin used in Example I was passed through the same extrusion system of Example I. The die was similar to Example I except for the differences as illustrated in FIGS. I–III. Thus the lip offset X was 0.050". The distance Y was 0.090 inch. Extruder speed was taken from low rates, below 34 R.P.M. to about 56 R.P.M. on the extruder. Very low levels of melt fracture were observed by the visual method at extruder sppeds up to 56 R.P.M. At 56 R.P.M. (running about 25% higher than in previous examples) melt fracture was at a very low level.

What is claimed is:

1. A process for reducing melt fracture formed during extrusion of a molten narrow molecular weight distribution, linear, ethylene polymer, under conditions of flow rate and melt temperature which would otherwise produce higher levels of melt fracture which comprises extruding said polymer through a die having a discharge outlet defining an exit die gap formed by opposing die lip surfaces and wherein one surface of the die lip and/or die land in contact with the molten polymer extends beyond the opposing surface of the die lip and/or die land in the direction of the axis of flow of the molten polymer through the die exit, said extended die lip having a groove extending around said extended die lip, said groove being disposed opposite the surface of the opposing die lip whereby melt fracture is reduced on the surface of the film leaving the extended die lip surface.

2. A process according to claim 1 wherein said extended die lip extends from about 0.010 inch to about 0.400 inch beyond said opposing die lip surface.

3. A process according to claim 2 wherein said groove has a leading edge which coincides with the leading edge of said extended die lip.

4. A process according to claim 3 wherein the length of said groove extends from the leading edge of said extended die lip to a point below the leading edge of said opposed die lip.

5. A process according to claim 4 wherein said groove is of a generally trapezoidal configuration.

6. A process according to claim 5 wherein the distance between said leading edge of said opposed die lip surface and the furthermost inward distance of said die groove in line with said leading edge is about 0.03 to 0.250 inch.

7. A process as in claim 1 wherein the ethylene polymer is formed into blown film.

8. A process as in claim 1 wherein the ethylene polymer is slot cast into film.

9. A process as in claim 1 wherein the ethylene polymer is formed into pipe.

10. A process as in claim 1 wherein the ethylene polymer is a linear low density ethylene hydrocarbon copolymer.

11. A process as in claim 10 in which said copolymer is a copolymer of ethylene and at least one $C_3$ to $C_8$ alpha olefin having a melt index of about $\geq 0.1$ to about $\leq 20$.

12. A process as in claim 11 in which said copolymer is a copolymer of $\geq 90$ mol percent ethylene and $\leq 10$ mol percent of at least one $C_3$ to $C_8$ alpha olefin.

13. A process as in claim 12 in which said copolymer has a molecular weight distribution of about $\geq 2.7$ to $\leq 6.0$ and a total unsaturation content of about $\geq 0.1$ to $\leq 0.3$ C=C/1000 C atoms.

* * * * *